UNITED STATES PATENT OFFICE.

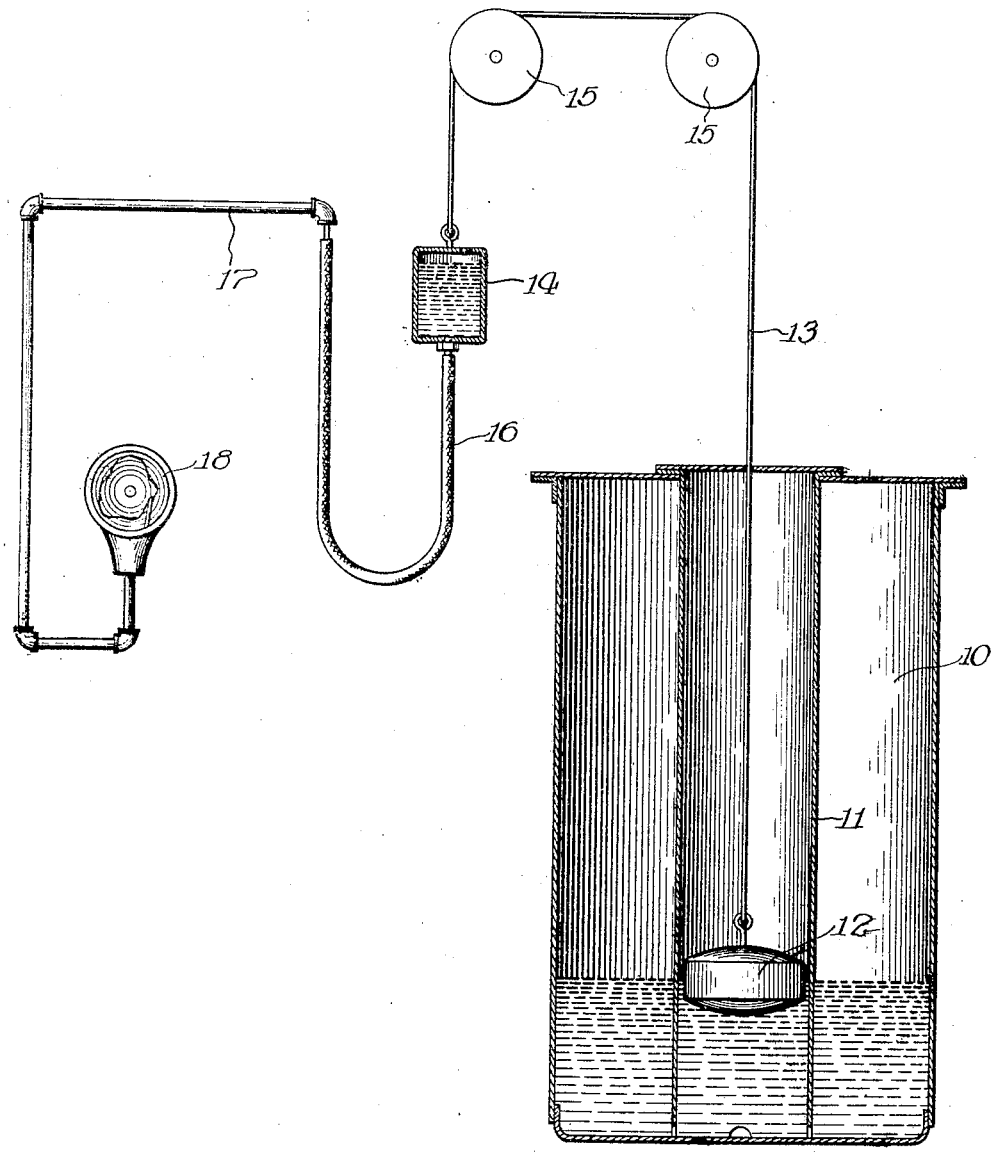

LENOX S. MASON, OF BIRMINGHAM, ALABAMA.

TANK-LEVEL RECORDER.

1,251,679.   Specification of Letters Patent.   Patented Jan. 1, 1918.

Application filed February 7, 1917. Serial No. 147,129.

*To all whom it may concern:*

Be it known that I, LENOX S. MASON, a citizen of the United States, and resident of Birmingham, in the county of Jefferson and State of Alabama, have invented certain new and useful Improvements in Tank-Level Recorders, of which the following is a specification.

My invention relates to a novel device so constructed as to adapt it for accurately registering or recording the height of liquid in a container, such as a tank.

It is frequently important to a plant superintendent or engineer to have before him a record showing the height of liquid in a tank or container at different times, or at that particular time. The quantity of liquid in the tank at certain times may have an important bearing on certain operations, and an accurate study of cause and effect requires a record showing liquid levels at all times of the day, or periods of operation.

Certain objections have been made to the level recorders at present on the market and it is an object of the present invention to overcome such objections by apparatus in which the accuracy of indication is not dependent upon the specific gravity of the liquid or upon the maintenance of a constant pressure of air or other fluid.

In the device of my invention the means employed for varying the pressure on the recording gage includes no delicate parts; the parts are not subject to the deteriorating effects of the air or weather, and the operations or actions are uniform, notwithstanding wide variations in temperature.

The invention will be more readily understood by reference to the accompanying drawing in which the figure is a sectional view partly diagrammatic in form illustrating an embodiment of my device.

In the drawing a tank, 10, is shown, having a float-guiding well, 11. Within this well or chamber is mounted the float, 12, connected by a cable, 13, to a liquid-container, 14, the cable passing over suitable sheaves or pulleys, 15. A flexible tube, 16, connects the container, 14, to a pipe, 17, at the extremity of which a recording gage, 18, is mounted. If it is unnecessary to retain a record of the tank level, a simple pressure gage may be employed in place thereof.

In operation the container, 14, is filled with a suitable liquid and vented to the atmosphere, it being understood that the liquid has displaced the air in the flexible tube, 16, line 17, and recording gage 18. The float, 12, rises and falls, corresponding to the height of the liquid within the tank and the container, 14, will rise and fall to the same extent; therefore the hydrostatic pressure exerted upon the recording gage, 18, will vary accordingly.

My invention is not limited to the reverse vertical movement of the float and container as the suspension member may be so arranged that the container and float may both rise together or both fall together.

By reason of the arrangement shown, a liquid may be selected which has no injurious effect upon the gage or connecting parts and as the operation of the device is independent of temperature changes or atmospheric conditions, the continued accuracy thereof may be considered certain.

Of course, the exact arrangement of parts is immaterial. The essential feature is that there shall be a liquid container connected to a float and having relative movement therewith, or a liquid container which rises and falls with the level of the liquid in the tank, this container being in communication with a recording or indicating gage.

Modifications in the form and arrangement will suggest themselves to those skilled in the art and I do not wish to be limited except as indicated in the attached claims.

I claim;

1. In a level recording device for liquids, the combination of a float, a liquid container connected thereto for corresponding vertical movement, a recording pressure gage, and a flexible tubular connection between the gage and container, the arrangement being such that variations in elevation of the float produce corresponding variations in head of the liquid acting on the gage which variations in head are recorded by said gage, substantially as described.

2. In a recording device, the combination of a member adapted to be supported on the surface of the liquid, the level of which is to be recorded, a liquid container connected to said member for movement in unison therewith, a recording pressure gage, and a tubular connection between the gage and container, variations in height of said member being recorded on said gage by variations in head of the liquid acting on said gage, substantially as described.

3. In a recording device, the combination of a member adapted to be supported on the surface of the liquid, the level of which is to be recorded, a liquid container connected to said member for movement in unison therewith, a recording pressure gage, a flexible tube connecting the gage and container, and a fixed quantity of liquid in the container, tube and gage, variations in the gage being caused by variations in head of the liquid acting thereon, substantially as described.

4. In a level recorder for liquid tanks, the combination of a float, a liquid container connected to said float for movement in unison therewith, a recording gage, a flexible tube containing a fixed quantity of liquid and connecting said gage with said liquid container, variations in height of said float being transmitted to said gage through changes of head of liquid in said tube.

5. In a level recorder for liquid tanks, the combination of a liquid container, a float, means for connecting said container to said float whereby the container is adapted to rise and fall according to the changes in the level of the liquid in the tank and a gage under pressure of the liquid in said container and acted on by the changes in head due to rise and fall of the container.

In witness whereof, I have hereunto signed my name.

LENOX S. MASON.